June 22, 1965  F. A. CALDWELL ETAL  3,191,182
APPARATUS FOR MAKING WIDE ANGLE PICTURES
Original Filed Sept. 6, 1956   6 Sheets-Sheet 1

INVENTORS
FRANK A. CALDWELL
RICHARD S. BRUMMER
BY
*Elliott & Pastoriza*
ATTORNEYS June 22, 1965   F. A. CALDWELL ETAL   3,191,182
APPARATUS FOR MAKING WIDE ANGLE PICTURES
Original Filed Sept. 6, 1956    6 Sheets-Sheet 2

INVENTORS
FRANK A. CALDWELL
RICHARD S. BRUMMER
BY Elliott & Pastoriza
ATTORNEYS

June 22, 1965  F. A. CALDWELL ETAL  3,191,182
APPARATUS FOR MAKING WIDE ANGLE PICTURES
Original Filed Sept. 6, 1956  6 Sheets-Sheet 3

INVENTORS
FRANK A. CALDWELL
RICHARD S. BRUMMER
BY Elliott & Pastoriza
ATTORNEYS

*INVENTORS*
FRANK A. CALDWELL
RICHARD S. BRUMMER
BY Elliott & Pastoriza
*ATTORNEYS*

June 22, 1965   F. A. CALDWELL ETAL   3,191,182
APPARATUS FOR MAKING WIDE ANGLE PICTURES
Original Filed Sept. 6, 1956                6 Sheets-Sheet 5

*INVENTORS*
FRANK A. CALDWELL
RICHARD S. BRUMMER
BY *Elliott & Pastoriza*
*ATTORNEYS*

INVENTORS
FRANK A. CALDWELL
RICHARD S. BRUMMER
BY Elliott & Pastoriza
ATTORNEYS

United States Patent Office 3,191,182
Patented June 22, 1965

3,191,182
APPARATUS FOR MAKING WIDE ANGLE PICTURES
Frank A. Caldwell, Pacific Palisades, Calif., and Richard S. Brummer, Houston, Tex., assignors, by direct and mesne assignments, to Cyclodrama Inc., a corporation of California
Original application Sept. 6, 1956, Ser. No. 608,351, now Patent No. 3,078,758, dated Feb. 26, 1963. Divided and this application Feb. 8, 1963, Ser. No. 257,231
10 Claims. (Cl. 352—69)

This application is a division of our co-pending application Serial No. 608,351, filed September 6, 1956, and entitled Method and Apparatus for Making Wide Angle Pictures, now United States Patent No. 3,078,758 issued February 26, 1963.

This invention relates generally to systems for making wide angle pictures. More particularly, it has to do with novel motion picture cameras in which scenes covering azimuth angles up to and even greater than 180 degrees may be photographed.

While the art of making wide angle pictures has progressed rapidly in recent years, the problem of distortion as a result of the use of wide angle lens is still a serious limitation. Generally, the wider the angle of scene encompassed by the camera lens, the greater is the distortion, particularly at the fringe areas. Moreover, uniform focusing and light intensity are difficult to achieve.

The distortion and focus problem may partially solved by simply dividing the azimuthal angle of the scene to be photographed into three parts or sectors. Three cameras may then be employed to photograph the respective scenes simultaneously whereby each camera need only employ a lens of sufficient angle to cover its particular sector. The three films may then be projected simultaneously with three projectors casting their respective images onto a curved screen. While this system enables very wide angle scenes to be photographed and projected, the adjacent edges of the various images must be accurately blended to provide a composite appearing picture. Invariably, a vertical "frame" edge or demarcation line will appear on the screen where two adjacent scene portions meet in the absence of accurate blending. The presence of these vertical frame edges will be accentuated if the projectors and registration of the respective films are not perfectly synchronized. In the absence of such synchronization, the scene portions will appear to jar slightly with respect to each other.

Thus, if the use of a wide angle lens is to be avoided to minimize distortion and focusing problems, the new problem of synchronizing separate images to introduce a composite picture is introduced. If a single wide angle lens is employed to provide a single composite picture, distortion and blurring at the fringe areas result.

Bearing the above in mind, it is a primary object of the present invention to provide novel systems for making extremely wide angle pictures covering angles up to and even greater than 180 degrees which may be projected on a continuous curved screen and in which there are no frame lines and substantially no distortion throughout the entire arcuate length of the picture.

More particularly, it is an object to provide an apparatus for making a wide angle motion picture of extremely high resolution and uniform focus throughout its entire area.

Another object is to provide a system of the above type in which the motion picture film may be projected by a conventional type movie projector available in most commercial motion picture theaters with only a slight modification to the projector itself.

Still another important object of the present invention is to provide a novel motion picture camera for making wide angle pictures in which motion picture film is fed through the camera at a uniformly constant speed so that the mechanical drive mechanism for the camera is greatly simplified with an attendant increase in reliability, and the camera may operate with a minimum of noise and vibration.

An auxiliary object in connection with the aforementioned object is to provide a novel light directing and blocking means obviating the necessity of conventional type shutter mechanism whereby mechanical simplicity and reliability is further insured.

For convenience in describing the present invention, the following terminology will be used throughout the specification and claims. A "slit of light" is herein interpreted to mean the long and narrow boundaries of a portion of an image projected by light onto a surface. These projected boundaries in turn are formed by a "slot," which term as used herein refers to a long and narrow opening in a physical body. Thus, a "slit of light" is provided on a surface by passing light through a slot, and such "slit" may be moved along the surface by physically moving the slot. Further, the term "light directing means" is meant to include a movable slot structure formed in a physical body for defining the direction of light passing through such slot.

Briefly, the motion picture camera for carrying out the invention includes a curved gate through which the film is passed and caused to conform into a cylindrically shaped surface. The angle subtended by this arcuate surface ordinarily is at least equal to the angle of the scene to be photographed. A cylindrical canister serving as a light directing means is positioned with its axis coinciding with the axis of the cylindrically shaped film surface and provided with diametrically opposed lateral slots through which light may pass. In a first embodiment, the lens is supported in the canister between the opposite slots such that its rear nodal point is spaced a given distance from the axis of rotation. The entire canister is then rotated whereby the projected slit of light is caused to move progressively over the curved film surface. By continuously rotating the canister at a rate properly proportioned to the film speed, new unexposed film is moved into position for exposure during the period of time after the slit has left one end of the curved surface and before it starts a new sweep. A suitable shutter system is employed with this embodiment to block light from passing through the slots during this latter period of time.

In a second embodiment, a pair of canisters constitutes the light directing means, each having only a single slot. These canisters are axially aligned, one above the other, and the lens is held in a stationary position in axial alignment between the two. Each of the canisters contains a mirror for directing light received laterally through one slot in the first canister down through the lens and out the second slot in the second canister. By this arrangement, no shutter system is necessary and wide angle pictures even exceeding 180 degrees may be readily taken by isolating the lower canister and curved gate from light adjacent the upper canister.

In each embodiment, the pictures are photographed horizontally on the film such that the horizon of the picture is generally parallel to the film edges. In projecting the film in conventional type motion picture projectors, it is, therefore, necessary to rotate the image ninety degrees before it reaches the motion picture screen. To this end, a lens attachment for conventional motion picture projectors may be provided whereby such projectors may be readily employed to project movies taken with the present cameras.

A better understanding of this invention will be had by referring to the following detailed description and accompanying drawings, in which.

Figure 4:
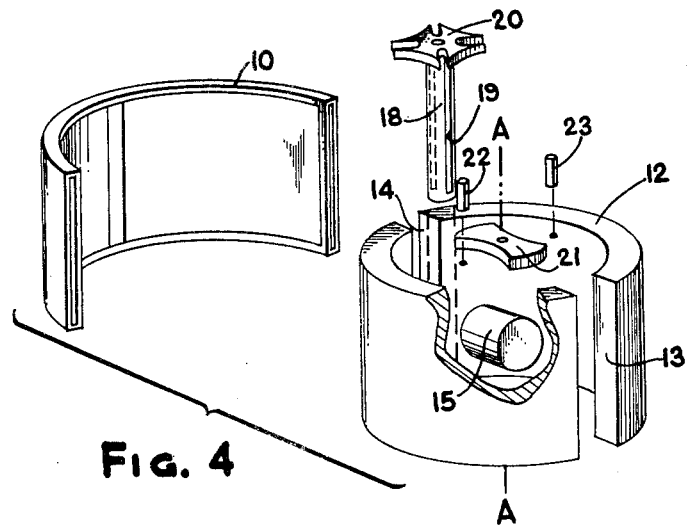
FIGURE 4 is an exploded perspective view illustrating one type of shutter mechanism.
Figure 9:
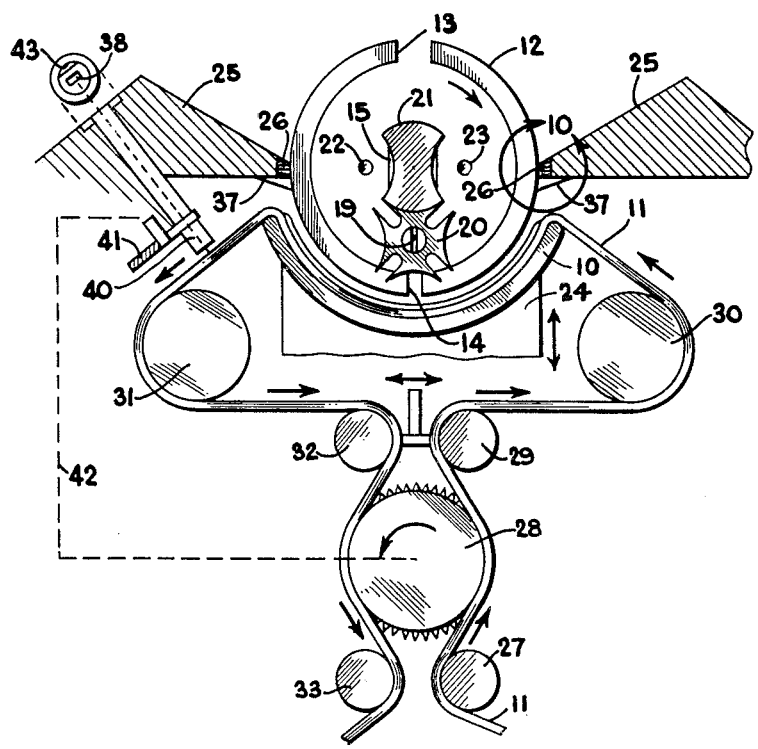
Figure 10:
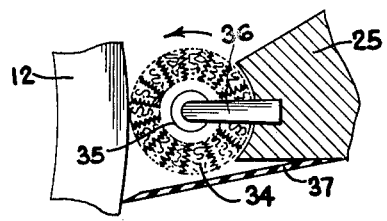
Figure 11:
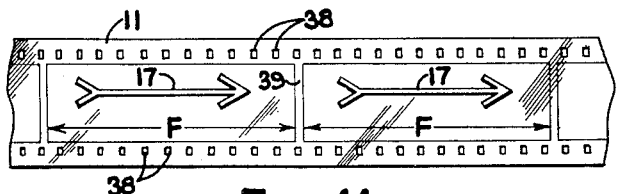
Figure 12:
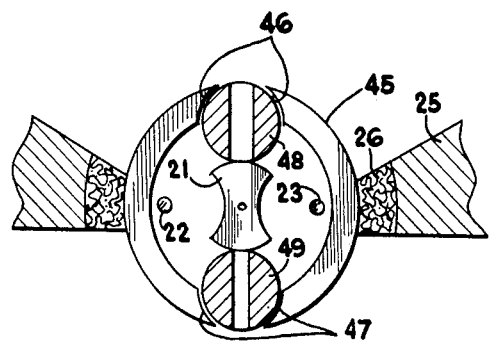
Figure 13:
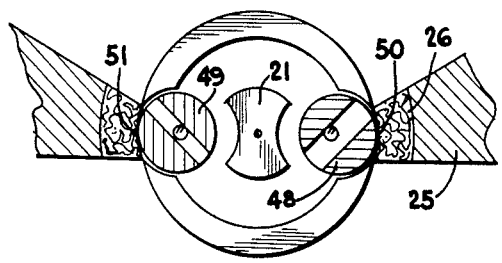
Figure 14:
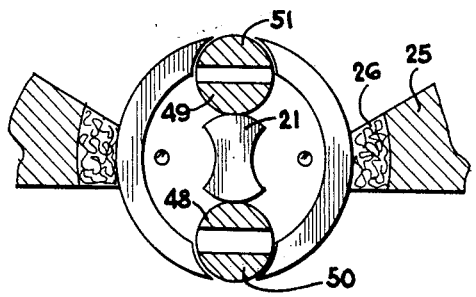
Figure 15:
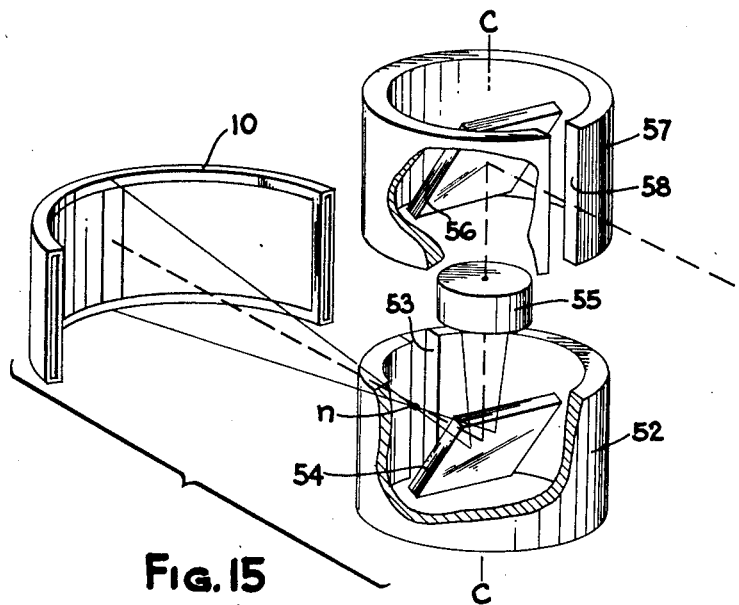
Figure 16:
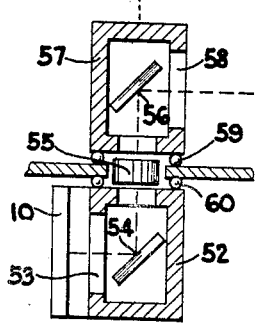
Figure 17:
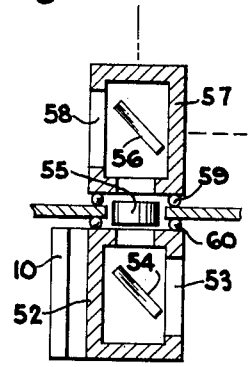
Figure 18:
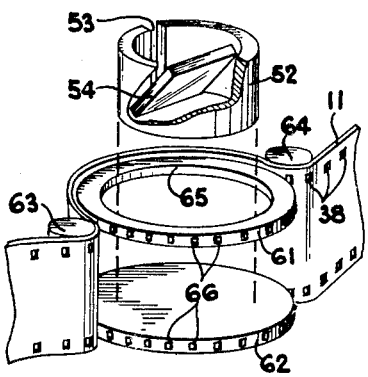
Figure 19:
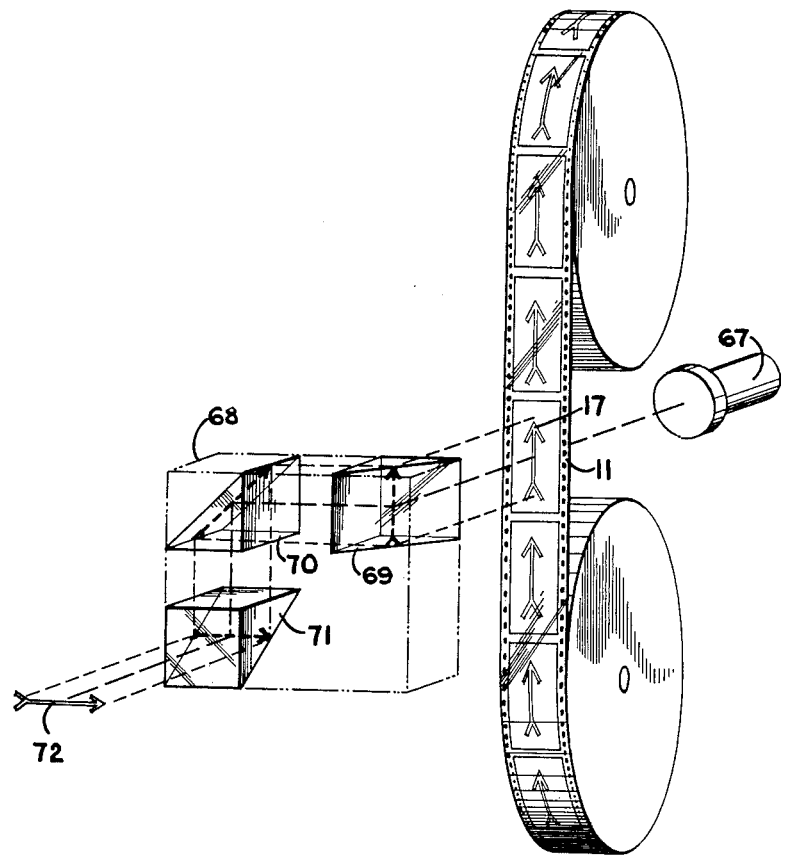

FIGURES 5, 6, 7, and 8 are schematic plan views illustrating the operation of the shutter mechanism of FIGURE 4 in successive positions;

FIGURE 9 is a schematic view partly in section of the camera in greater detail;

FIGURE 10 is an enlarged view showing a modified feature of that portion of FIGURE 9 enclosed within the circular arrow 10;

FIGURE 11 is a plan view of a strip of motion picture film illustrating image frames photographed in accordance with the present invention;

FIGURES 12, 13, and 14 illustrate a modified shutter and light blocking arrangement for use with the camera of FIGURE 9;

FIGURE 15 is an exploded perspective view of another important embodiment of the invention;

FIGURE 16 is a reduced cross section in schematic form of the apparatus shown in FIGURE 15 illustrating certain of the components in a first position;

FIGURE 17 is a view similar to FIGURE 16 illustrating the identical components in a second position;

FIGURE 18 is another exploded perspective view of a further modification of one feature of the invention; and FIGURE 19 is a perspective schematic view of one type of lens system for use in projecting motion picture film made with the cameras of this invention.

Figure 1:
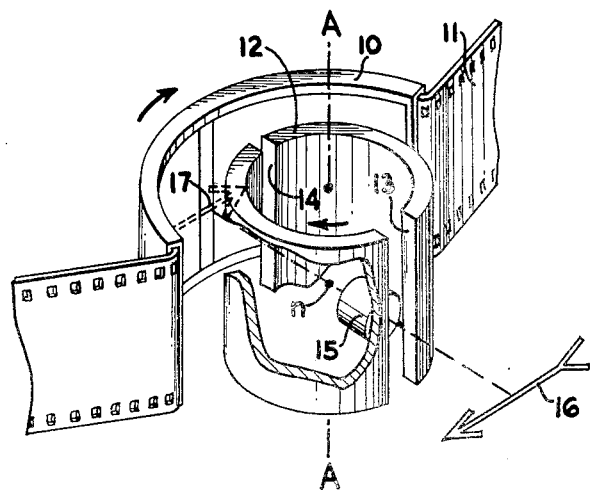
FIGURE 1 is a highly schematic perspective view of certain primary components employed in a camera of the present invention.

Referring to FIGURE 1, there is shown a curved film gate 10 for guiding and curving a film 11 into a curved cylindrical surface. Also, shown in FIGURE 1 is a cylindrically shaped light directing means in the form of a canister 12 having a lateral light entrance slot 13 and a diametrically opposite lateral light exit slot 14. The canister 12 is arranged in the embodiment illustrated in FIGURE 1 to support a motion picture camera lens 15, the front side of the canister 12 being broken away to clearly illustrate the lens. The lens 15 is positioned such that its rear light nodal point $n$ coincides with the axis A—A of the canister 12. The axis A—A also coincides with the axis of the cylindrically curved gate 10. By this arrangement, light from a scene or object 16 to be photographed passes through the entrance slot 13, the lens 15, and out the exit slot 14, to fall on the curved cylindrical portion of the film 11. The exit slot 14 is so dimensioned that only a portion 17 of the image of the object 16 is contained in the slit of light projected on the film.

If the conister 12 of FIGURE 1 is now rotated, for example, in a clockwise direction as viewed from above, the slit of light will pass from one end of the curved cylindrical surface to the other end thereby successively exposing the film to incremental portions of the image of the object 16. This type of exposure is similar to that which takes place in conventional cameras employing focal plane shutters. In the embodiment of FIGURE 1, the curved cylindrical film surface must remain stationary which the light slit passes from one end of the curved surface to the other inasmuch as the image portion 17 is stationary as a result of rotating the lens 15 about its rear nodal point.

Figure 2:
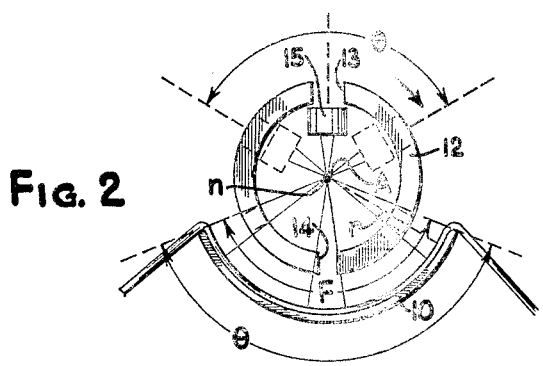
FIGURE 2 is a schematic plan view of the components illustrated in FIGURE 1, useful for explaining the operation of the invention.

Referring to FIGURE 2, the manner in which a wide angle scene is photographed by the arrangement of FIGURE 1 will become clearer. In FIGURE 2, let $r$ equal the distance from the rear nodal point $n$ to the curved gate 10, corresponding to the lens focal length, and let $\theta$ represent the angle of the scene to be photographed. In this event, the arcuate curve of the film gate 10 will subtend a similar angle $\theta$. Rotation of the canister 12 through an angle $\theta$ will then cause the light slit to sweep over the entire curved gate thereby exposing the curved film surface to the entire scene covered by the angle $\theta$.

It is to be noted that the lens 15 need not be a wide angle lens, but may constitute any conventional precision aspherical or spherical camera lens. Further, since the lens is rotated about the rear nodal point $n$ which axis coincides with the axis of the cylindrically curved gate 10, the particular image portion focused on the curved film surface at the constant distance $r$ therefrom will be uniformly clear throughout the entire arcuate movement of the lens 15. It should also be noted that since a relatively narrow slit of light exposes each portion of the curved film surface, the exposure time of each such incremental portion is extremely short whereby very clear pictures of high resolution may be readily made of moving objects. In the event the exit slot is widened so that a wider image portion exposes the film to provide a longer exposure time, a curved field lens would preferably be employed. In any event, each portion of the picture will be in substantially perfect focus even at the fringe areas since the distance $r$ remains the same. Any tendency for slight blurring at the upper and lower edges of the cylindrically curved film surface may be readily accommodated by providing a lens having a relatively deep depth of focus. Of course, a vertical field flattener may be employed to flatten the field in a vertical plane. It is important to emphasize that with any one of these lens systems there is substantially no distortion or blurring throughout the entire image inasmuch as the horizontal angle of view covered by the lens used is considerably less than the azimuth angle of the scene to be photographed.

Referring again to FIGURE 2, the arrangement described thus far may be employed for making motion pictures as well as providing single wide angle pictures. In the embodiment of FIGURE 2 in which the lens 15 is arcuately swung about its rear nodal point $n$, the film 11 must be held stationary while the light slit is progressing from one side of the curved surface to the other. In making motion pictures, the conister 12 may be stopped after the light slit has passed the left hand end of the curved surface as viewed in FIGURE 2. The film 11 may then be moved a distance, designated F and corresponding to the horizontal frame length or the arcuate distance of the curved gate 10, to provide a fresh unexposed portion of curved film at the gate. The canister 12 is then started to cause the slit to sweep over the new portion of film. Alternate repetition of these steps will produce a succession of frames on the film 11.

In making these motion pictures, the canister 12 may be oscillated between the extreme amplitude limits of the arcuate curve of the gate 10, and the film 11 moved only after the light slit has passed the amplitude limits. As an alternative to oscillating the canister 12 to sweep the light slit back and forth over the curved surface, the canister 12 may be continuously rotated. In this event, a shutter system must be employed to block light from passing through the canister slots when the rear exit slot 14 has moved past the gate in front of the camera to prevent light from passing in the reverse direction through the slots and onto the film while a new portion of film is being positioned in the gate. Such a shutter system will be described shortly.

Figure 3:
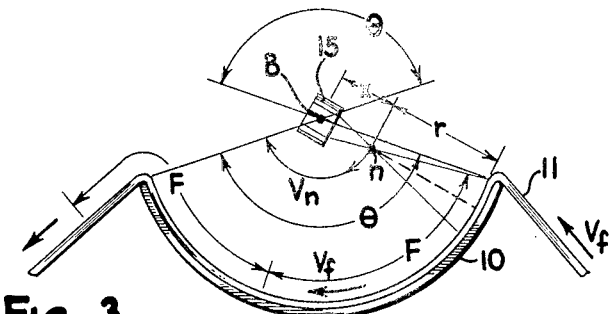
FIGURE 3 illustrates a modified arrangement in accordance with one important embodiment of the present invention.

Referring to FIGURE 3, there is shown an improved system for making motion pictures in accordance with a preferred embodiment of the present invention in which the film 11 is caused to move at a constant linear speed through the gate 10. In FIGURE 3, the canister is not shown to avoid obscuring the drawing but would ordinarily be positioned to support and rotate the lens about a new axis B, spaced from the nodal point $n$. By this arrangement, the lens is rotated off its nodal point such that the nodal point $n$ will swing in an arcuate curve as indicated by the arrows. By rotating the lens off its nodal point, it is possible to make motion pictures without having to move the film 11 in an intermittent manner.

In FIGURE 3, let $x$ represent the distance between the rear nodal point $n$ and the axis of rotation for the lens, and let $r$ represent the distance from the nodal point $n$ to the film surface as in FIGURE 2. Also, let $V_n$ represent the linear speed of the nodal point $n$ at any instant of time, and let $V_f$ represent the linear speed of the film in the curved gate at any instant of time. In order that the portion of the image contained in the slit of light not be blurred on the moving film 11, it is important that this portion of the image move at precisely the same speed as the film. The image may be caused to move at this speed by insuring that the linear speed of the nodal point $n$, as represented by $V_n$, is equal to the linear speed of the film $V_f$. In the special case of FIGURE 2, for example, these conditions prevailed inasmuch as the linear speed of the point $n$ was zero and the film was held stationary during the photographic process. Thus, $$V_n = V_f \quad (1)$$

If the linear speed of the nodal point $n$ is to be equal to the linear speed of the film 11, the angular velocities of the lens and of the film will be different since the radius ($x$) from the axis of rotation to the nodal point is less than that to the film ($x+r$).

If the desired horizontal length of each picture frame to be photographed on the moving film 11 is again designated F and the film 11 is to be moved at a constant linear speed $V_f$ and the lens 15 rotated at a constant angular velocity such that the linear speed of its nodal point $n$ is $V_n$, the following first condition must be satisfied: the length of time for the nodal point $n$ to sweep through the entire angle $\theta$ from one end of the curved film portion to the other must be equal to the length of time for the film frame F to move from a position in which its right hand end is coincident with the right hand end of the curved gate 10 to a position in which its left hand end is coincident with the left hand end of the film gate. This condition is necessary in order that the entire angle $\theta$ of the scene may be placed on a single film frame F during rotation of the lens 15 through the angle $\theta$. If $\theta$ is given in radians, this condition of equal times may be expressed by the following equation:

$$\frac{x\theta}{V_n} = \frac{(x+r)\theta - F}{V_f} \quad (2)$$

The second condition is that the time during which the light slit has passed one end of the curved gate 10 and is swinging about in front of the camera back to its initial position must be equal to the time for the next frame to move into the position formerly occupied by the first frame illustrated in FIGURE 3. These equal times are expressed by the equation:

$$\frac{x(2\pi - \theta)}{V_n} = \frac{2F - (x+r)\theta}{V_f} \quad (3)$$

From equations 1 and 2 it will be evident that:

$$x\theta = (x+r)\theta - F \quad (4)$$

and from equations 1 and 3 it will be evident that:

$$x(2\pi - \theta) = 2F - (x+r)\theta \quad (5)$$

Simultaneously solving equations 4 and 5 by eliminating F, there results:

$$2\pi x = r\theta$$

solving for $x$ yields:

$$x = \frac{r\theta}{2\pi} \quad (6)$$

Equation 6 above gives $x$ in terms of $r$ and $\theta$. If $\theta$ is given in degrees rather than radians then:

$$x = \frac{r\theta}{360°} \quad (7)$$

It will also be evident from equations (5) and (6) that:

$$F = r\theta \quad (8)$$

This last equation (8) is immediately evident from an inspection of FIGURE 2 wherein rotation takes place on the nodal point and the length of the frame F is equal to the length of the curved gate, $r$ being the radius from the axis of rotation to the film plane.

As an example of the use of Equation 7, if $\theta$ is equal to 160°, $x$ will equal $4/9 r$, and if $\theta$ equals 180°, $x$ will equal $r/2$.

The distance from the rear nodal point $n$ of the lens to the axis of rotation may accordingly be calculated in accordance with the desired angle of scene to be photographed, the focal length $r$ of the lens employed, and the desired length of each picture frame on the film 11. In commercial motion picture photography, the usual rate of speed for the film 11 is 24 frames per second. By determining the desired length F for each frame from Equation 8, having previously selected $r$ and $\theta$, the proper film speed $V_f$ may at once be calculated. This film speed in turn will equal the linear speed $V_n$ for the nodal point $n$. The value of $x$ may then be computed from the above equations and the angular velocity computed from the linear speed $V_n$ for the nodal point $n$; $x$ may also be immediately calculated from Equation 6. Therefore, motion pictures may be made by rotating the lens off its nodal point at a constant speed thereby permitting the film to be moved at a constant speed, and intermittent film operation and the attendant mechanical difficulties associated therewith are eliminated.

As mentioned heretofore, when the lens 15 is rotated constantly in one direction, a shutter system must be provided for blocking light from reaching the curved gate 10 when the light slit has passed one extreme end of the gate and is swinging around in front of the camera. There are many different types of shutter systems that may be employed. A preferred arrangement for effecting this shuttering operation is illustrated in FIGURES 4 through 8.

In the exploded view of FIGURE 4, there is shown a shaft 18 having an elongated light passage slot 19 passing laterally therethrough and a star shaped cam 20 secured to its upper end. The shaft 18 is arranged to be positioned between the lens 15 and one of the slots 13 or 14. In the embodiment illustrated in FIGURES 4 to 8, the shaft 18 is positioned between the exit slot 14 and the lens 15. A stationary cam block 21 and cam pins 22 and 23 are positioned above the canister 12 in cooperative relationship with the star cam 20 when in assembled position as will become clear by referring to FIGURES 5 through 8.

Figure 5:
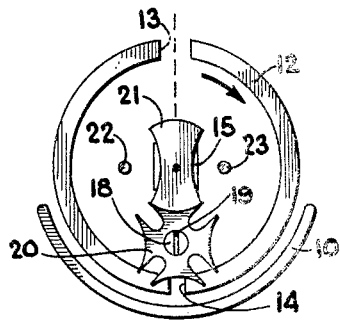

In FIGURE 5 it will be noted that the light passage slot 19 in the shaft 18 is in alignment with the rear exit slot 14 of the canister 12 so that light may pass through the entrance slot 13, lens 15, light passage 19 in the shaft 18, and rear slot 14 to the curved film gate 10. As the canister 12 is rotated in a clockwise direction, as indicated by the arrow, it will be noted that the light slot 19 in the shaft 18 is caused to rotate such that it will remain in alignment with the exit slot 14. This action is effected as a result of the star cam surface engaging the arcuate surface of the cam block 21.

Figure 6:
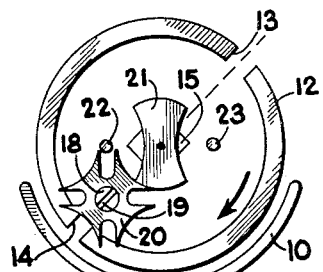
Figure 7:
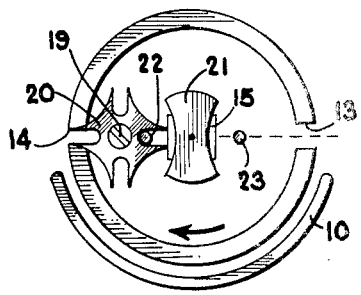
Figure 8:
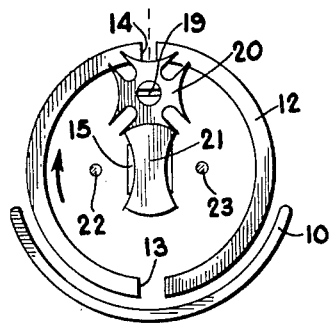

The stationary pins 22 and 23 are arranged to engage the star cam 20 when the light slit reaches the extreme ends of the film gate such as to cause a ninety degree rotation thereof. As illustrated in FIGURE 6, for example, the pin 22 is received in one portion of the star cam as the exit slot 14 on the canister 12 approaches one extreme end of the curved film gate 10. In FIGURE 7, the position of the star cam as a result of the action of the pin 22 is illustrated, wherein the light passage 19 has been turned through an appreciable angle out of alignment with the exit slot 14. In FIGURE 8, it will be noted that the star cam is positioned such that the light slot is at right angles to the entrance slot 13 and exit slot 14 in the canister 12 whereby all light is blocked from passing to the curved film gate 10. When the star cam is engaged by the stationary pin 23, a similar rotation of the shaft 18 takes place to rotate the light slot 19 into alignment with the slots so that an image will fall on the curved film surface and the process repeated.

This shutter system is desirable in that it is always properly indexed with respect to motion of the canister 12 so that accurate operation is assured. As mentioned heretofore, however, many other types of shutter arrangements will occur to those skilled in the art; the present system is set forth merely as exemplary.

Referring now to FIGURES 9, 10, and 11, there is illustrated in greater detail one embodiment of a motion picture in accordance with the present invention. In FIGURE 9, the various components described thus far with respect to FIGURES 1 to 8 are identified by the same reference numerals.

In the actual embodiment of the camera, the curved film gate 10 is preferably supported on a slide block 24 whereby it may be moved with respect to the canister 12 in a linear direction towards or away from the central axis thereof as indicated by the two headed arrow. In loading the camera, the slide block 24 is retracted rearwardly to provide a sufficient opening to insert the film 11. Preferably, a fine adjustment is also provided on the slide block so that focusing may be effected by movement of the entire curved film surface with respect to the lens 15 in the canister 12, as well as by conventional type focusing of the lens 15. Focusing by means of moving the curved film gate will enable certain portions of the image on the film to be brought into very sharp focus while other portions will not be affected as much. This type focusing results from the fact that the film surface is curved whereas the motion of the gate on the block 24 is straight.

The canister itself is supported on the front camera casing 25 for rotation. The front opening of casing 25 receiving the canister has its side edges lined with resilient felt material 26 which frictionally engages the canister 12 in order to block light from entering past the sides of the canister. The film itself travels in the direction of the arrows. Commencing at the lower right hand portion of FIGURE 9, the film 11 passes over a first guide roller 27 about a driving sprocket roller 28. From the sprocket roller 28, the film passes over a second guide roller 29, flywheel roller 30, and thence through the curved gate 10 about a second flywheel roller 31, guide roller 32, about the other side of the drive sprocket roller 28, to guide roller 33 and a suitable take-up reel. The rollers 29 and 32 may be movable and placed under tension, while the flywheel rollers 30 and 31 include conventional features for insuring constant uniform film movement. The manner of insuring absolute uniform film movement by introducing flywheel effects and tensioning rollers to eliminate any irregularities, is so well known in the art that they need not be gone into in detail at this point. It is to be noted, however, that in the camera of the present invention the fact that uniform film speed is employed eliminates much of the conventional difficulty inherent in intermittently operated film drives. Additional rollers may be and preferably are provided at the entrance and exit ends of the film gate 10 to decrease friction.

An important problem in the camera design illustrated in FIGURE 9 is that of insuring that no light will leak around the edges of the canister 12 when it is rotated at high speed. While simple felt lining such as 26 described above may be used, the friction of the felt on the canister is undesirable. In FIGURE 10, an improved means for blocking light at the peripheral edges of the cylindrical canister 12 is illustrated. As shown, a roller of resilient material 34 such as soft felt is supported on a roller shaft 35 mounted between suitable journalling trunnions 36 supported at the edge of the casing 25. In addition, a flexible stripping 37 may be provided immediately behind the roller 34 to block further any light that may pass the roller when the slotted portions 13 and 14 of the canister pass by the felt. By providing a light proofing flexible material capable of rolling on the surface of the canister 12, much friction between the camera casing light blocking material and the canister is avoided.

FIGURE 11 illustrates a portion of the motion picture film employed with the camera of FIGURE 9. As shown, the frames are positioned horizontally on the film so that the horizon of the image is parallel to the edges of the film. The length of each frame is designated F in FIGURE 11 and the complete image 17 photographed onto the film from the object 16 of FIGURE 1 is shown. Various sprocket holes 38 for driving the film are also illustrated. Between each of the successive frames, there is a small frame line 39. The width of this frame line 39 may be adjusted by masking the extreme edges of the curved gate 10. Alternatively, the desired length of the frame line may be varied by simply changing the value of $x$ and making a corresponding change in the other parameters, such as the rotational speed of the canister 12 and the speed of film movement. In these ways, suitable spacing between the successive frames of any desired length may be obtained. If no masking is provided on the curved gate 10 and the frame length F desired is employed in the previous equations to determine the other parameters, then each successive frame will be immediately adjacent the preceding frame with substantially no frame line present.

It is important in the camera of this invention that each of the successive frames commence at precisely the same point with relation to the sprocket holes 38. If such is not the case, subsequent projection of the film will cause the frame line 39 to appear in some scenes whereas it may be absent in other scenes. This random relationship between sprocket holes and frame lines is a result of the starting and stopping of the drive mechanism in the camera between the shooting of various scenes. In other words, it is almost impossible to insure that the tension rollers 29 and 32 for damping irregularities in the film motion will assume precisely identical positions each time the camera is started for a new scene.

In order, therefore, to insure that each picture frame will be in identical relationship with the sprocket holes 38 as corresponding frames in earlier scenes, the apparatus of FIGURE 9 includes means for aligning the film 11 with respect to the curved gate 10 such that the photographed picture will remain in a constant relationship with respect to the sprocket holes. Referring to the upper left hand corner of FIGURE 9, this mechanism includes a sight tube 40 extending from the exterior of the casing 25 to a point adjacent the moving strip of film 11. A mechanical shutter 41 is arranged to be driven in synchronism with the drive roller 28 as indicated by the broken line 42. The shutter is so arranged with respect to the sight tube and is so dimensioned with respect to the spacing of the sprocket teeth that any single sprocket 38 will appear to be stationary as seen through the sight tube 40 when the film is being driven at any desired speed. This stroboscopic action is used in the present invention for positioning the sprocket holes with relation to the curved gate 10 by centering one of the sprocket holes appearing in the sight tube 40 directly in the center of the sight tube opening 43 illustrated in FIGURE 9. Since the distance from the exit end of the curved gate 10 to the sight tube 40 is held constant by the camera structure, the appearance of a stationary sprocket hole 38 in the center of the viewing opening 43 each time that the camera is to be used for shooting a scene will insure that the picture frame will bear a constant relationship with respect to the sprocket holes. In the event one-half of two adjacent sprockets appear in the sight tube opening 43, the rollers 32 and 29 may be simultaneously moved to the right or left as indicated by the double headed arrow a short distance until the sprocket hole is centrally positioned in the sight tube opening.

The operation of the camera illustrated in FIGURE 9 is identical to the operation of the system illustrated in FIGURES 3 to 8, the film 11 moving at a constant uniform speed through the curved gate 10 and the shutter slot opening 19 being actuated by the star cam 20 and cam block 21 to shield the film from the lens when the canister 12 has moved to a position such that the exit slot 14 is passing about the front portion of the camera outside the casing 25.

In certain embodiments, it may be desirable to employ a relatively wide entrance slot 13 and/or a wider exit slot 14. In such instances, rotation of these slotted portions past the light blocking means 26 may result in some light leaking about the casing 25 because of the absence of a smooth surface in the slot area for the resilient light blocking material 26 to engage. In order to insure even more complete light blocking when the slotted portions are passing the felt lining material 26, a modified cam and shutter system such as illustrated in FIGURES 12, 13, and 14 may be employed.

Referring to FIGURE 12, for example, there is illustrated a canister 45 in which the front entrance slot has sloping sidewalls 46 converging to sharp points at the outer periphery. Similarly, the exit slot is provided with tapered walls 47 leading to a sharp point at their peripheral portions. Suitable slotted rollers 48 and 49 having radii corresponding to the tapered portions 46 and 47, respectively, are positioned as shown and arranged to be operated by star cams (not shown) and a center cam plate 21 together with pins 22 and 23 similar to the plate 21, and pins 22 and 23 illustrated in FIGURES 5 to 8. The star cams are axially mounted above the rollers 48 and 49 but are not shown in FIGURES 12, 13, and 14 in order to avoid obscuring the remainder of the drawing. These cams, however, will cooperate with the stationary cam pins 22 and 23 to rotate the rollers sequentially as illustrated in FIGURES 5 through 8.

By providing large rollers 48 and 49, their peripheral surfaces such as at 50 and 51, serve to complete the peripheral curved portion of the canister 45 at the slot points when these slots are passing the light blocking material 26. As a result, a relatively continuous smooth surface is presented to the light blocking material. Upon a 180° rotation of the canister 45 from the position shown in FIGURE 12 to the position shown in FIGURE 14, it will be noted that the star cam action with the pins 22 and 23 and the cam plate 21 causes the rollers 48 and 49 to rotate to a position where all light is blocked from passing through the canister. Therefore, these rollers serve simultaneously as a shutter means as well as a means for completing the curved surface of the canister slot portions when they are passing the edges of the camera casing.

It will be appreciated from the embodiments described thus far, that the maximum angular scene that may be photographed is 180°. It would not be possible to photograph an angular scene greater than 180° by the mechanism illustrated in FIGURE 9 since the curved film gate 10 would then be overlapping part of the scene to be photographed at the exterior of the camera.

In another embodiment of applicants' invention illustrated in FIGURES 15, 16, 17, and 18, there is provided a novel system whereby scenes greater than 180° may be photographed and the heretofore described shutter systems eliminated. Referring first to the exploded view of FIGURE 15, there is illustrated the film gate 10 which may be of an arcuate extent greater than 180° but which is shown as extending approximately the same as in the previous embodiments in order to simplify the drawings. In the embodiment of FIGURE 15, the light directing means comprises a first canister 52 provided with a light exit slot 53 and an optically flat mirror 54 positioned to receive light axially passing into the canister and projector such light through the slot 53 onto the curved film portion in the gate 10. In this instance, the lens 55 is held in a stationary position axially above the canister, and the canister 52 rotated to rotate the mirror 54 and cause the slit of light to sweep over the curved cylindrical film as previously described. Light is passed through the lens 55 by a second mirror 56 within a second canister 57 provided with an entrance slot 58. The entrance slot 58 is diametrically opposite to a portion of the canister 57 corresponding to the portion of the canister 52 containing the exit slot 53. The canister 57 is arranged to be rotated simultaneously with the canister 52 while the lens 55 is held in a stationary position axially between the canisters. The lens is constructed and positioned such that its rear nodal point $n$ will fall between the mirror 54 and the exit slot 53 as shown in FIGURE 15 so that rotation of the canisters about the axis C—C will rotate the nodal point $n$ as described in connection with FIGURE 3.

Inasmuch as the upper canister 57 for receiving light from the scene to be photographed is axially displaced above the canister 52 and the film gate, the camera casing may be designed such that the canister 57 may rotate over greater than 180° of arc and similarly the canister 52 may rotate over an angle greater than 180° to expose a curved film without any interference between the curved film and the scene to be photographed.

It will also be evident from the arrangement of FIGURE 15, that blocking of light from the curved film during the portion of time when the exit slot 53 has passed the arcuate end of the film gate is automatically effected by the relative position of the upper canister with respect to the lower canister. Referring to FIGURE 16 which illustrates the canisters 52 and 57 in schematic cross sectional view, it will be noted that in the position shown, light entering from the right through the entrance slot 58 is reflected by the mirror 56 through the lens 55 to the mirror 54 and onto the curved film portion in the gate 10. In FIGURE 17, after the canisters have rotated through 180° for example, light is blocked from entering the right hand side of the canister 57 and similarly any light from the mirror 54 passing through the exit slot 53 is directed away from the curved gate 10. The canisters are arranged to rotate with respect to the lens 55 upon bearings 59 and 60 which are made light proof so that no light can pass from the upper portion of the camera to the lower canister portion except through the lens 55 and the slots.

Another feature which may be employed with the dual canister arrangement described in connection with FIGURES 15, 16, and 17 is that of actually spinning the film gate or a portion of the mechanism holding the film in a curved cylindrical shape, with movement of the film thereby minimizing friction between the film gate and moving film. Referring to FIGURE 18, such a film gate system is shown as comprising a pair of discs 61 and 62 cooperating with film rollers 63 and 64 for shaping the film moving therepast into a curved cylindrical surface. The top disc 61 is provided with a central opening 65 through which light from the upper canister 57 and lens 55 of FIGURE 15 passes through to the mirror 54 of the lower canister 52. In FIGURE 18, the lower canister 52 is shown in exploded view above the disc 61 to avoid obscuring other portions of the drawing, but in assembled condition, the canister 52 is positioned between the discs 61 and 62 and the inside surface 65 of the opening in the upper disc constitutes a light proof bearing.

By the arrangement described, the discs 61 and 62 may be free to rotate to minimize friction. Alternatively, however, the discs 61 and 62 may actually be used to drive the film 11 by the provision of sprocket teeth 66 on the periphery of each of the discs. By driving the film at this point, the problem of gate friction is wholly eliminated inasmuch as the driving of the film is effected at the gate.

It is to be understood that in the actual construction of the camera, the principles of which have been illustrated and described in FIGURES 16, 17, and 18, suitable bearings, light proof casings, and dividers would be employed as well as conventional type gear drive means for rotating the various elements. These features are obvious to people skilled in the art and have not been illustrated in order to avoid obscuring the important components of the system. It should be clear from FIGURE 18, however, that the rollers 63 and 64 may be positioned further around the discs 61 and 62 so that a curved film surface portion equivalent to almost 360° could be provide. At least ten or twelve degrees would be necessary to accommodate the rollers 63 and 64 which would be positioned relatively close together. By employing the mirror system and dual canisters of FIGURES 15, 16, and 17, it will be evident that extremely wide angle pictures may be photographed with minimum distortion and clear focus at every point on the film.

As will be recalled from FIGURE 11 and previous portions of the description, the actual images on the motion picture film extend horizontally such that the image horizons are parallel to the film edges. In order to project these motion pictures in conventional motion picture projectors employed in commercial theaters at the present time, it is necessary to provide some means for rotating the image through ninety degrees in order that the projected picture will appear upright to the audience. FIGURE 19 illustrates a simple mirror system for accomplishing this ninety degree rotation.

In the schematic illustration of FIGURE 19, there is shown a projection light source 67 passing through a film frame on the film 11 to project the image 17 into a mirror casing 68. Casing 68 includes a first mirror or prism 69 oriented to reflect the image horizontally at ninety degrees to its original direction. This horizontal directed reflected image in turn is again reflected by a second mirror or prism 70 ninety degrees vertically. The reflected image from the second mirror 70 is then again reflected ninety degrees horizontally by a third mirror or prism 71, the latter horizontal direction being at ninety degrees to the first horizontally reflected image from the mirror 69. The projected image reflected from the third mirror 71 will assume a horizontal position as shown at 72. The mirror casing 68 thus serves to rotate the vertical image 17 into a horizontal position for proper projection and this arrangement of mirrors may be employed with any conventional projector.

In projecting the images on a curved screen in a motion picture theater, suitable lenses well known in the art may be employed for insuring that the image is properly in focus at all points on the curved screen. Since each portion of the image itself is in perfect focus as a result of the particular method and apparatus described for taking the movies, these images may actually be projected on a flat screen, all parts of which would appear in proper focus and without distortion. In the event that they are projected on a curved screen extending a considerable arcuate extent about the motion picture theater, however, suitable correcting lenses would have to be employed in the projector to correct distortion resulting from the fact that the projector would not ordinarily be positioned at the center of curvature of the curved screen. Lenses for projection purposes of this type are so well known in the art that they need not be described in detail here.

From the above description of the various types of cameras of the present invention, it will be evident that a vastly improved system has been provided for making wide angle pictures. While the principles of this invention have been described in connection with motion pictures, it will be evident that many of these principles are applicable to the making of still pictures of extremely wide angles.

Further, it should be understood that the precise camera structures for carrying out the principles of the invention may be varied considerably. For example, a single elongated canister could be employed in place of the dual canisters of FIGURE 15. Alternatively, simple turrets could be used to simply rotate the mirrors, the width of either mirror itself defining the width of the projected slit of light.

Various other modifications and refinements falling within the scope and spirit of this invention will readily occur to those skilled in the art. This invention, therefore, is not to be thought of as limited solely to the particular schematic illustrations and examples chosen for illustrative purposes.

As used in the following claims, the word "film" is defined herein to constitute any photo-sensitive surface and the word "mirror," to include prisms and other equivalents.

What is claimed is:

1. A motion picture camera for making wide angle motion pictures of a scene on a motion picture film, including, in combination: a curved gate adapted to receive and curve film passing therethrough into a cylindrically shaped film surface; drive means for continuously moving said film through said gate at a constant speed; a camera lens; light directing means receiving light passing through said lens and mounted with respect to said gate for rotation about an axis coinciding with the axis of said cylindrically shaped film surface, said light directing means including means for projecting a slit of light containing a portion of an image of said scene onto said film surface, said slit being parallel to the axis of said cylindrically shaped surface; and means for rotating said light directing means at a constant rate to cause said slit of light to move from one end of said film surface to the other in a direction normal to its long dimension, the rear nodal point of said lens being spaced between the axis about which said light directing means is rotating and said film surface, said light directing means being rotated at a rate such that the linear speed of said nodal point is equal to and in the same direction as the linear speed of said film surface, whereby said film surface is successively exposed to said image in incremental portions corresponding to said portion of said image contained in said slit of light to provide an exposed picture frame, a successive picture frame on said moving film being similarly exposed upon each complete rotation of said light directing means.

2. A motion picture camera according to claim 1, in which said light directing means comprises a cylindrically shaped canister, having an exit slot in a lateral wall thereof, the opposite lateral wall of said canister having an entrance slot, said lens being supported within said canister between said exit and entrance slots to receive light entering from said entrance slot and pass light through said exit slot; shutter means positioned and adapted to block light from exposing said film surface upon actuation; and actuating means to actuate said shutter means during a portion of time after said slit of light has passed said other end of said film surface and before said slit of light passes said one end of said film surface.

3. A motion picture camera according to claim 2, in which said shutter means comprises a shaft having an elongated opening therethrough, said shaft being mounted on said canister for rotation about an axis passing between said lens and one of said lateral slots in a direction parallel to the axis of said canister, whereby rotation of said shaft 90° moves said opening from a position in alignment with one of said lateral slots to a position out of alignment therewith so that light is blocked from passing through said slots; said actuating means comprising a stationary cam block positioned symmetrically with respect to the axis of said canister; a star shaped cam wheel secured to the end of said shaft adapted to ride about said cam block upon rotation of said canister; and stationary pin means adapted to engage said star shaped cam wheel to effect said actuation of said shutter.

4. A motion picture camera according to claim 3, including a light proof casing having a front opening within which said canister rotates; and resilient light blocking means lining the edges of said opening adjacent the periphery of said canister whereby light is blocked from passing between said canister and the edges of said opening.

5. A motion picture camera according to claim 4, in which said light blocking means comprises rollers of resilient light blocking material mounted at the edges of said opening for rotation with said canister whereby friction between said light blocking material and canister surface is minimized.

6. A motion picture camera according to claim 5, including a slotted roller adjacent the other of said lateral slots in said canister; said shaft and roller being actuated by said actuating means and having sufficient diameters to provide smooth blocking surfaces at said slots when said slots are passing said light blocking means to provide a substantially continuous surface upon which said light blocking means rides.

7. A motion picture camera according to claim 1, including a sight tube positioned to enable at least one sprocket hole on said film to be observed from the exterior of said camera; shutter means driven at a speed determined by the speed of said film; and means for moving said film with respect to said gate independently of said drive means whereby the relationship of the sprocket holes in said film and picture frames on said film may be maintained constant by causing the presence of a sprocket hole appearing to remain stationary to be positioned in the center of said sight tube.

8. A motion picture camera according to claim 1, in which said light directing means comprises a pair of mirrors in the form of a periscope for receiving light from said scene and passing said light vertically downwardly along an axis coincident with the axis of said cylindrically shaped film surface and thence laterally in the form of said light slit to said film surface, said lens being axially disposed between said mirrors.

9. A motion picture camera according to claim 1, in which said light directing means comprises a first cylindrically shaped canister having an exit slot in a lateral wall thereof; a first mirror rigidly positioned within said first canister to receive light passing axially into said first canister and reflect said light into a path at 90° to said axis such that said reflected light passes out through said exit slot, said camera lens being positioned in axial alignment with the axis of said first canister; a second cylindrically shaped canister in axial alignment with said lens and first canister and having an entrance slot in its lateral wall positioned diametrically opposite its wall portion corresponding to the lateral wall portion of said first canister defining said exit slot; and a second mirror rigidly positioned in said second canister to receive light passing through said entrance slot and reflect said light in a path at 90° to said incoming light such that said reflected light is axially directed out of said second canister to said lens.

10. A motion picture camera according to claim 10, in which said curved gate comprises arcuate portions of a pair of spaced parallel discs, said first canister being receivable between said discs and one of said discs having a central axial opening for receiving light passing axially into said first canister; said discs being mounted for rotation in unison to move with said film whereby friction between said film and curved gate is minimized.

References Cited by the Examiner

UNITED STATES PATENTS

| | | | |
|---|---|---|---|
| 866,257 | 9/07 | Case | 95—16 |
| 2,794,379 | 6/57 | McNeil | 95—16 |
| 2,863,713 | 12/58 | Hiroshi Mito | 95—16 |
| 2,966,096 | 12/60 | D'Incerti et al. | |

JULIA E. COINER, *Primary Examiner.*